Aug. 21, 1928.  J. M. TAMAN  1,681,380
PEDAL LOCK
Filed March 31, 1927
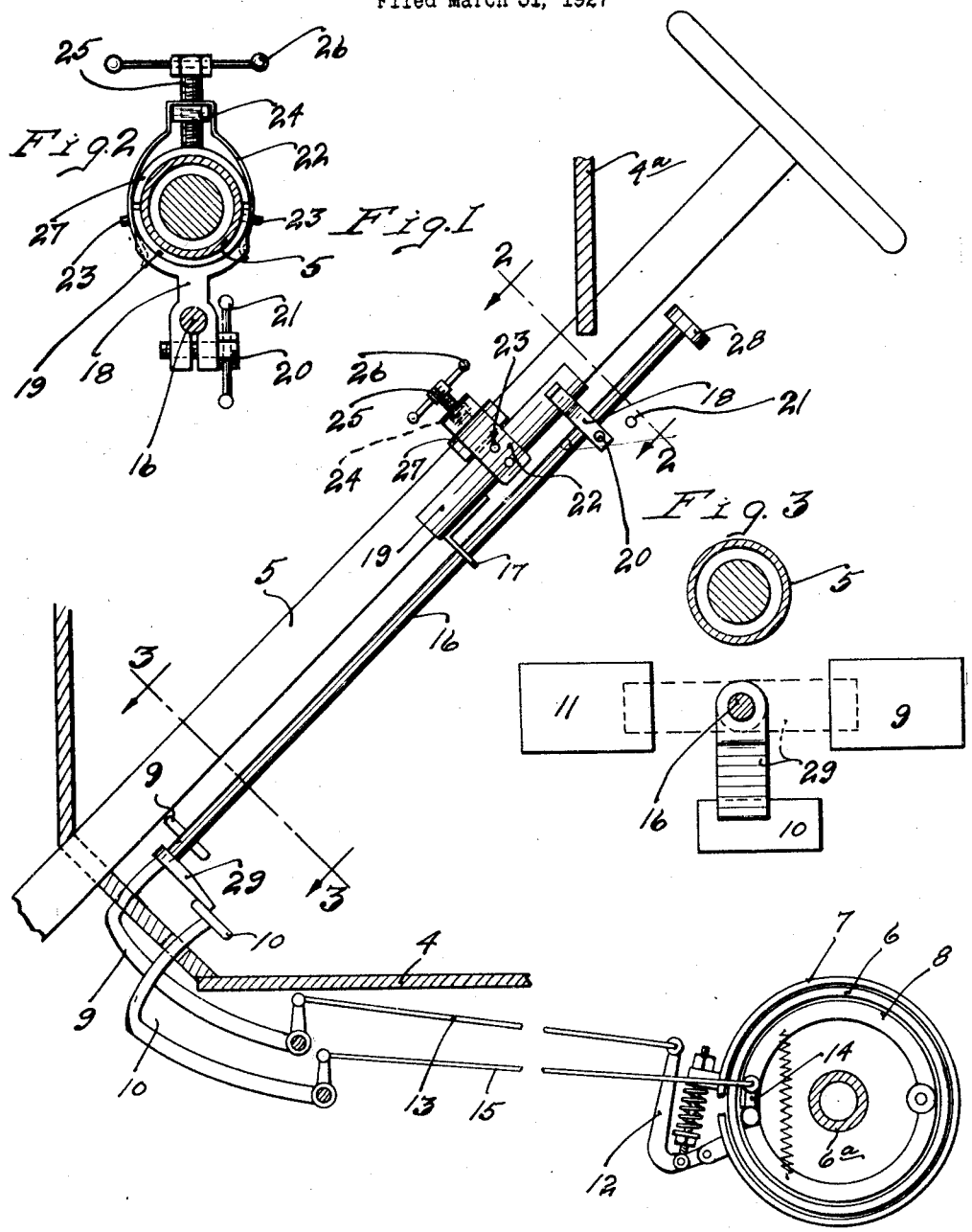
Inventor
Joseph M. Taman
By his Attorneys
Merchant & Kilgore Patented Aug. 21, 1928.

1,681,380

UNITED STATES PATENT OFFICE.

JOSEPH M. TAMAN, OF MINNEAPOLIS, MINNESOTA, ASSIGNOR OF ONE-HALF TO WALTER TAMAN, OF MINNEAPOLIS, MINNESOTA.

PEDAL LOCK.

Application filed March 31, 1927. Serial No. 179,870.

My invention provides a pedal lock for automobiles or motor-propelled vehicles, and by the use of which any one of several pedals may be locked and secured in any degree of depression, all as will hereinafter more fully appear.

Generally stated, the invention consists of the novel devices and combinations of devices hereinafter described and defined in the claims.

The nature and purpose of the invention may be more readily explained after having first described the preferred arrangement illustrated in the accompanying drawings, wherein like characters indicate like parts throughout the several views.

Referring to the drawings:

Fig. 1 is a view partly in vertical section and partly in diagram showing the improved pedal lock applied to the steering post casing of an automobile in such relation to the several pedals that it may be readily adjusted for engagement with any one of the pedals and quickly moved to hold the aligned pedal depressed to any desired extent;

Fig. 2 is a section on the line 2—2 of Fig. 1; and

Fig. 3 is a section on the line 3—3 of Fig. 1.

Of the parts of the automobile, the numeral 4 indicates the floor and dashboard, the numeral 4ª the instrument board, the numeral 5 the steering post casing, the numeral 6 one of the brake drums, the numeral 7 an external brake band, the numeral 8 the internal brake shoe, the numeral 9 the pedal for operating the external brake band, the numeral 10 the pedal for operating the internal brake shoe, the numeral 11 the clutch pedal, and the numeral 6ª the rear axle casing. The pedal 9 operates the external brake band 7 through a lever 12 and connecting rod 13, while the pedal 10 operates the internal brake shoe 8 through a lever 14 and connecting rod 15. Such brake-operating connections are well understood and need not be here further discussed except to call attention to the fact that when the pedal 9 is depressed, the external brake will be set, and when the pedal 10 is set, the internal brake will be set. This internal brake and its operating pedal 10 constitute what may be here treated as the emergency brake and the use of a pedal for operating the emergency brake, while not found in the ordinary automobile, is entirely feasible and, in fact, in connection with the pedal lock, constitutes a feature of the invention. The service brake pedal 9 and the clutch pedal 11 are the usual equipment found in automobiles.

The improved pedal lock may be made either as a permanent or as a removable attachment, but, as shown, it is of the latter arrangement. As its chief element, this pedal lock comprises a lock rod 16 that is mounted to freely slide and to rotate through suitable guides mounted on the steering post casing 5. As shown, said rod thus moves through two bearings 17 and 18, both of which are secured to a semi-cylindrical saddle plate 19. The bearing 18 is split and a clamping screw 20 is applied through its prongs. The head of this screw 20 is provided with projecting arms 21 by means of which the screw may be caused to tightly clamp the bifurcated end of the bearing 18 directly onto the rod 16. As a simple means for firmly but detachably holding the saddle plate 19 to the stering post casing, I provide a clamping yoke 22, the prongs of which are provided with perforations adapted to engage pins 23 on said saddle plate. The yoke 22 has a rectangular portion that holds a square nut 24 through which works a clamping screw 25 equipped with arms 26 that adapt the inner end of said screw to be tightly forced against a supplemental saddle plate 27 and thereby clamping the latter against the steering post casing.

At its outer end, the lock rod 16 is provided with a head or operating hand piece 28, and at its lower end, said rod is provided with a radially projecting foot 29 that is adapted to be turned into alignment with either one of the pedals 9, 10 or 11. In Fig. 3, said foot is shown turned into alignment with the pedal 10, but by dotted lines, its position for engagement with the pedals 9 and 11 is indicated.

Operation.

By reference to Fig. 3, it will be noted that there is sufficient space between the steering post casing 5 and the pedals 9 and 11 to permit the foot 29 to be moved below the heads of the pedals, and if desired, against the inclined portion of the foot board 4, where it will be entirely out of the way. When the lock device is to be used or positioned so that it may be quickly thrown into operative position, the rod will be set up in an upper position with its foot above the pedals. When it is desired to lock any one of the three pedals into a depressed position, it is only necessary to depress the pedal with the foot, then, while the screw 20 is released, to quickly turn the foot 29 into alignment with the depressed pedal and to quickly move the rod 16 downward until its foot engages the depressed pedal, and then, by a quick movement of the screw 20, to lock said rod and engaged pedal in their depressed positions.

There are several reasons for the use of this lock to hold one or the other of the pedals depressed. For example, it may at times be desired, while repairing the automobile mechanism, to hold the clutch pedal depressed. Again it may be desirable, while adjusting or equalizing service brakes, to keep the pedal in a depressed position, and this may be done by using the lock to hold the pedal 9 depressed. By the use of this device to hold the pedal depressed while adjusting the brakes, the service of one man is eliminated, as it is necessary to have a predetermined pressure upon the brake pedal in order to equalize the brakes properly. The emergency brake pedal 10 is used preferably in place of the customary emergency lever. It often happens that one of the two sets of brakes provided is out of order or adjustment. By the use of this device and the two brake pedals, the operator may use the pedal of the operative brake for parking, for the reason that the lock can be readily applied to either of the brake pedals. Also, in this arrangement, if either of the brakes should be out of order, the operative brake, whether the internal or external, can be used as a service brake.

This device can be quickly and easily operated and takes up but very little space. It can be sold as an accessory and applied by any one not skilled in the art, it can be used as standard equipment, or can be used purely as a mechanic's tool for use in adjusting brakes. Due to the arc which the end portion of the foot piece 29 may be turned, it can be used on different makes of cars that have the pedals located in somewhat different positions.

What I claim is:

1. The combination with the steering post casing and pedals of an automobile, of a bearing on said casing, a lock rod mounted to freely rotate and to freely slide axially through said bearing, said rod at its lower end having a radially projecting foot arranged to be turned into alignment with any one of several of said pedals and to be quickly moved to lock any depressed pedal, said bearing having means for securing said rod in its different adjustments.

2. The structure defined in claim 1 in which said securing means includes a bifurcated bracket on said bearing, and a clamping screw applied to the bifurcated portion of said bracket.

3. In an automobile, the combination with a steering post casing, of a brake drum, internal and external brakes applied to said drum, independent depressible brake pedals with connections for operating said internal and external brakes, and a pedal lock mounted on said steering post casing for rotary and axial movements, said rotary movements serving to align said lock with one or the other of said pedals and said axial movement serving to move the same into engagement with the selected pedal under different degrees of depression.

4. In an automobile, the combination with two sets of brakes and depressible pedals for independently operating the same, of a pedal lock having two movements, the one serving to position the same for action on one or the other of said pedals and its other movement serving to move the same into engagement with the selected pedal under different degrees of depression.

5. The combination with the brake and clutch pedals of an automobile, of a lock rod mounted for sliding and oscillatory movements, said rod at its lower end having a radially projecting foot arranged to be turned into alignment with any one of several of said pedals and to be quickly moved axially to lock any depressed pedal.

6. The combination with the brake and clutch pedals of an automobile, of a lock rod mounted for sliding and oscillatory movements, said rod at its lower end having a radially projecting foot arranged to be turned into alignment with any one of several of said pedals and to be quickly moved axially to lock any depressed pedal, said lock rod having a frictional locking device intermediate of its ends.

In testimony whereof I affix my signature.

JOSEPH M. TAMAN.